L. L. ROBERTS.
NUT LOCK.
APPLICATION FILED SEPT. 21, 1907.

921,003.

Patented May 11, 1909.

Witnesses
J. C. Simpson
Arthur W. Crossley

Inventor
Lula L. Roberts.
By Chandler & Chandler
Attorneys

UNITED STATES PATENT OFFICE.

LULA L. ROBERTS, OF HILLIARD, FLORIDA.

NUT-LOCK.

No. 921,003.     Specification of Letters Patent.     Patented May 11, 1909.

Application filed September 21, 1907. Serial No. 393,952.

*To all whom it may concern:*

Be it known that I, LULA L. ROBERTS, a citizen of the United States, residing at Hilliard, in the county of Nassau, State of Florida, have invented certain new and useful Improvements in Nut-Locks; and I do hereby declare the following to be a full, clear, and exact description of the invention, such as will enable others skilled in the art to which it appertains to make and use the same.

This invention has relation to that class of nut-locks that are composed of two members or sections having a screw-threaded connection with themselves and the bolt on which they are turned and that have a construction and relationship in virtue of which a tendency of the clamping nut to turn "off" the bolt, will act upon the locking nut to turn the former nut "on", or at least stop it against being turned off.

It is the object of my improvements to provide each member of the device with a screw-threaded connection with each other, and each with the bolt, which screw-threaded connections will operate to lock the members on the bolt so that each will be locked against being turned off the bolt by the other and against turning on the bolt by any action of the latter.

The nature of the invention is fully and clearly ascertainable from the device portrayed in the annexed drawings, forming a part of this specification, in view of which it will first be described with respect to its construction and mode of operation, and then be pointed out in the subjoined claim.

Figure 1:
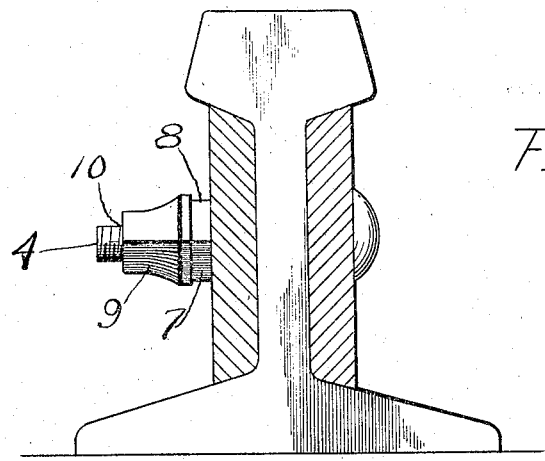
Figure 2:
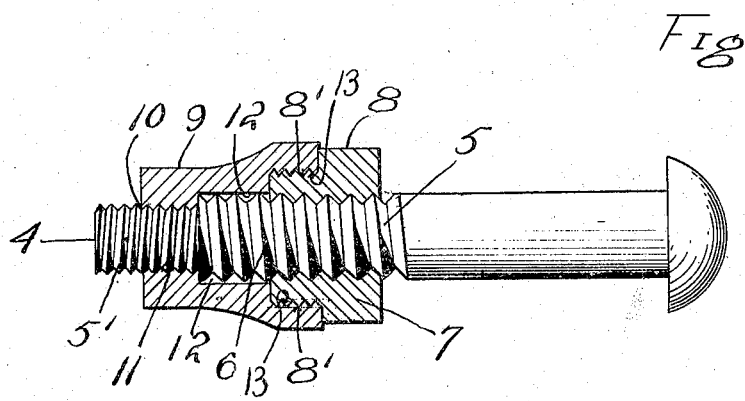
Figure 3:
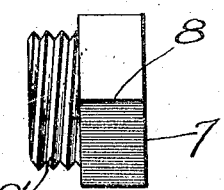

Of the said drawings—Figure 1 is a side view showing the invention applied to fish-bars and a railway rail the former being represented in section. Fig. 2 is a sectional side view of the invention, parts being shown in elevation. Fig. 3 is a side view of the clamping nut.

Similar characters of reference designate similar parts or features, as the case may be, wherever they occur.

While my invention may be engaged in any use to which it is applicable, it is especially adapted for use on bolts by which fishbars are clamped on the webs of rails at railway-rail joints to hold the parts in alinement. In any case the bolt is somewhat reduced on its end portion 4, which is provided with a relatively fine "left-hand" thread, and the adjacent portion 5 of the bolt is provided with a coarse "right-hand" thread 6. The body of the bolt forms an annular shoulder around the said reduced portion.

7 designates a clamping nut, internally threaded to be turned on the portion 5 of the bolt. Externally the inner part of 8 the nut 7 is made rectangular in cross section to admit of a wrench being applied thereto, while its outer part is made round and has a left-hand thread 8' cut thereon.

9 designates the locking nut, that may be square externally in cross section, the outer portion being preferably reduced in diameter. A hole 10 is made through the locking member, that on the outer reduced portion being of a size and screw-threaded at 11 in such a way as to adapt it to be turned on the finer screw-thread 5' of the bolt.

Inward from the internal screw-thread portion 11, the hole 10 is enlarged for a short distance as at 12, so as to admit the outer portion 5 of the bolt without being affected by the coarser screw-thread thereon.

The inner enlarged portion of the locking member 9 is socketed—that is, the hole 10 is enlarged considerably at the point 12, and is provided on the outer end with a left-hand thread 13 to adapt it to be screwed on the outer reduced threaded end 8' of the clamping nut 7.

In use the inner or clamping member 7 will be turned on the larger right-hand thread 6 of the bolt to an extent sufficient to secure the clamping or fastening. Then the locking member 9, will be turned on the finer left-hand thread on the end portion of the bolt until the socketed inner end of the said locking member engages the left-hand thread 8' on the outer reduced-end of the clamping member 7, and the locking member is turned home against the outer end of the clamping member, when the two members will be united by a screw connection with each other and independent and opposite screw-connections with the bolt. Moreover, the independent and opposite screw-threaded connections with the bolt will be by threads of different pitch, so that no actions of the nuts upon each other or vibrations of the bolt, tending to turn the nuts on the bolt or the bolt in the nut can operate to loosen them, while the locking member may be readily turned off by holding on to the clamping member and turning the former member in a direction opposite to that in which it was turned on.

It is to be noted that the bolt extends through both members of the nut, and that the threaded portions 5' and 6 of the bolt are longer than the threaded portions of the nuts engaged thereby, so that the bolt may be employed on different thicknesses of material, and the nut locked thereon.

It will be observed from an inspection of Fig. 2 that the parts are so proportioned that one of the interior shoulders on the nut 9 contacts with the shoulder at the end of the large screw 12 while the other two shoulders contact with the two shoulders on the exterior of the nut 8.

What is claimed is—

In a device of the kind described, a bolt provided with a shank having an annular shoulder near the end to form a reduced portion, threads formed on said shank and reduced portion, the threads on the shank being of greater pitch than the threads on the reduced portion, a nut having a threaded aperture held upon said shank, a reduced shouldered portion formed on said nut provided with threads on the exterior thereof of the same pitch as the threads on the reduced portion of the shank, a second nut provided with an aperture having threads therein adapted to engage the reduced portion of the shank, an enlarged shouldered portion adapted to fit over the end of the larger portion of the shank, and a second enlarged shouldered portion of the same length as the reduced portion of the first mentioned nut and provided with threads engaging the threads on the first mentioned nut, said second nut being arranged for the shouldered portions to bear against the shouldered portion of the shank, the face of the reduced portion of the first nut and the face adjacent said reduced portion of said first nut.

In testimony whereof, I affix my signature, in presence of two witnesses.

LULA L. ROBERTS.

Witnesses:
FRANK W. ZANDER,
R. H. ZANDER.